H. C. MUMMERT.
RETRACTIBLE LANDING GEAR FOR AIRCRAFT.
APPLICATION FILED DEC. 31, 1920.
1,435,139.                                      Patented Nov. 7, 1922.
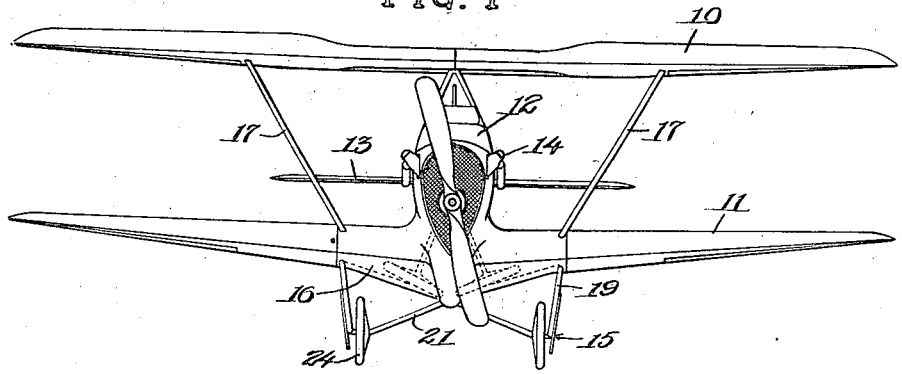
Fig. 1
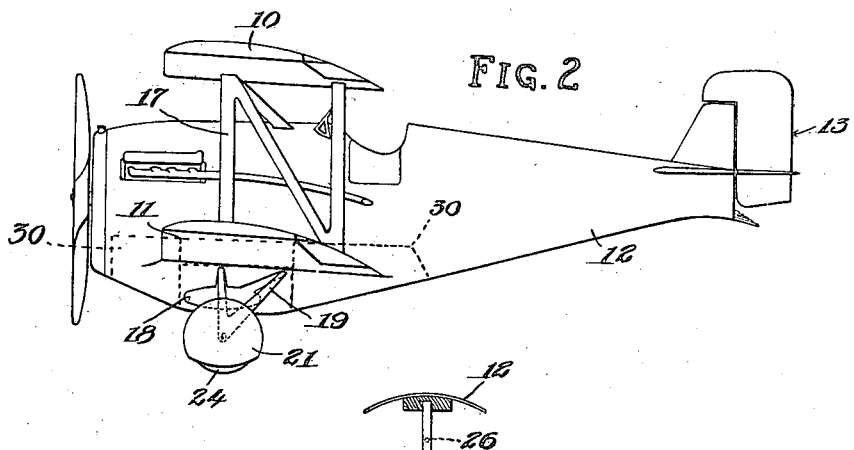
Fig. 2
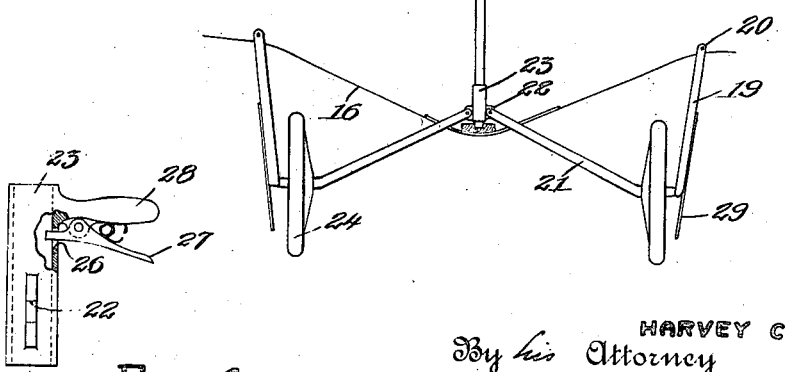
Fig. 3
Fig. 4
Inventor
HARVEY C. MUMMERT
By his Attorney Patented Nov. 7, 1922.

1,435,139

UNITED STATES PATENT OFFICE.

HARVEY C. MUMMERT, OF FLORAL PARK, NEW YORK.

RETRACTABLE LANDING GEAR FOR AIRCRAFT.

Application filed December 31, 1920. Serial No. 434,283.

*To all whom it may concern:*

Be it known that I, HARVEY C. MUMMERT, a citizen of the United States, residing at Floral Park, in the county of Queens and State of New York, have invented certain new and useful Improvements in Retractable Landing Gears for Aircraft, of which the following is a specification.

My invention relates to airplanes and is characterized in that the landing gear thereof is retractable or collapsible to minimize head resistance in flight. The landing gear per se includes a more or less conventional strut arrangement, landing gear wheels, shock absorber elastics and mechanism enclosed in the body of the craft to retract and project the landing gear at will. When retracted, the landing gear offers no resistance whatsoever. Thus positioned it is completely enclosed, the open space through which it is withdrawn and projected, being almost entirely covered over.

I realize that it is old in the art to equip an airplane with a collapsible or retractable landing gear. Such landing gears, however, in so far as I am aware, are either withdrawn vertically or substantially vertically into the fuselage or body and when fully retracted, are either partially exposed or are made to occupy space ordinarily required for other and equally as important airplane parts or accessories. This objectionable arrangement, by the present invention, I am able to almost entirely overcome. Instead of retracting the landing gear in its entirety substantially vertically, I so arrange the landing gear struts, axle and wheels, as to admit of lateral folding action, the wheels and struts when folded, extending horizontally or substantially horizontal, and for the major part being housed in the airplane wings. The wings, adjacent to the fuselage or body, are enlarged, i. e., made thicker and on their under surfaces are provided with openings to receive the struts and wheels. The wheels, of which there are preferably two, are mounted on separate outrigged axle sections or struts, in turn pivoted, the pivot axes of the last mentioned struts or axle sections being movable. The first mentioned struts, on the other hand, though pivoted, are provided with fixed pivot axes. Accordingly, as the landing gear is retracted, the struts having fixed pivoted axes and the wheels fold laterally inwardly and the struts having movable pivot axes fold substantially vertically, the fixed pivot axes of the struts defining the axes about which the landing gear as a whole is moved. Yielding connections between the struts and wheels are provided to take up landing shocks and at the same time permit folding of the landing gear in the manner indicated.

A further characteristic of the invention is the construction of the wings adjacent to the fuselage in such manner that they (the wings) in conjunction with the fuselage, afford a substantially V shape hydroplaning bottom upon which the craft may alight and effectually hydroplane in the event that a forced landing is necessary during operation over water. With the landing gear retracted, obviously such a landing could be made without damaging the machine and without injury to the pilot. One or more tanks are provided, containing air under pressure, to buoy the machine up on the water. Since the machine is designed essentially as a scout plane to be operated from a ship as a base, the wing construction admitting of a landing on water in an emergency, is quite desirable.

Further characteristics of the invention such as the interplane strut arrangement, the use of cover plates to partially close the openings in the wings through which the wheels are withdrawn, etc. will be hereinafter more fully pointed out.

In the drawings, wherein like characters of reference designate like or corresponding parts, Fig. 1 is a front elevation of an airplane constructed in accordance with my invention;

Fig. 2 is a side elevation of the machine illustrated in Fig. 1.

Fig. 3 is a detail front elevation of the landing gear showing the arrangement of the mechanism inside the body for retracting the wheels and collapsing the landing gear in its entirety; and Fig. 4 is a detail of the sliding sleeve or collar together with the mechanism for locking it in its adjusted position.

While I have illustrated and shall hereinafter describe a machine especially designed as a scout ship plane, it is to be understood that the constructional features of the landing gear are equally as well applicable to other and different types of craft. The biplane illustrated in Figs. 1 and 2 comprises supporting surfaces 10 and 11, a fuselage 12, an empennage 13, a motor 14 and a landing gear designated generally as 15. The top supporting surface preferably comprises abutting wings, each wing being of identical construction. The lower supporting surface 11, unlike the top surface 10, includes a center section 16 formed as an integral part of the fuselage or body. Upwardly divergent interplane struts 17 interbrace the superposed supporting surfaces. As indicated, the lower ends of the struts 17 are fixed to the center panel 16 adjacent to its outer ends. Said center panel 16 in the vicinity of the body 12 is enlarged or thickened as indicated in Fig. 1 and on its under side is provided with openings 18 through which the landing gear is withdrawn when retracted.

The landing gear viewed from either the front or side is of more or less conventional construction. It comprises V struts 19 having fixed pivot axes 20 and outrigged axle sections 21 having movable pivot axes 22. The struts 19 are preferably supported at the outer ends of the center panel 16 of the lower supporting surface and the axle sections 21 are preferably supported centrally of the fuselage, being carried, as indicated in Fig. 3, by a sliding sleeve or collar 23 movable vertically in retracting or projecting the landing gear. The wheels of the landing gear, designated as 24, are carried by the axle sections 21, preferably, one adjacent to the foot of each strut 19; suitable shock absorbing mechanism being provided at the foot of each strut to admit of yielding movement of the wheels in landing.

A vertical shaft 25 mounted inside the body 12 supports the sliding sleeve 23, the shaft adjacent its opposite ends being provided with apertures 26 which, together with a lever 27 carried by a handle 28 formed on the sleeve, constitutes the lock mechanism as well as the operating mechanism for the landing gear. When the landing gear is projected, the sleeve 23 occupies the position indicated in Fig. 3. To retract the landing gear it is but necessary to withdraw the lever 27 from engagement with the shaft 25 and elevate the sleeve until the lever 27 coincides with the opening 26 in the shaft adjacent to its upper end. Thus positioned, the lever 27, if released, will engage in the opening 26 to lock the landing gear in its retracted position.

The sleeve 23 in moving from the position indicated in Fig. 3 to a position at the opposite end of the shaft 25 carries the axle sections 21 with it, thereby withdrawing the wheels 24 laterally inwardly and upwardly through the openings 18 in the center panel and into the dotted line position indicated in Fig. 1. As the wheels move upwardly and inwardly the struts 19 pivot about their axes 20 until they too are enclosed in said openings. When thus enclosed the landing gear is completely removed from the line of air rush incident to flight. Cover plates 29 carried on the outer faces of the struts 19 are so positioned when the landing gear is retracted as to partially close the openings 18 in the wings.

The construction of the under surface of the center panel 16 is such that said under surface when the landing gear is retracted constitutes a hydroplane surface of V shape in transverse section, which hydroplane surface, in an emergency, will enable a skilled pilot to land the machine on water without damage to the machine or injury to the pilot. Tanks 30, containing air under pressure, are enclosed in the body to buoy the machine up on the water after such landing is made.

For structural reasons it is preferred that the strut 19 be mounted directly beneath the lower ends of the interplane struts 17. To so arrange the struts 17 and 19 gives strength to the landing gear. Moreover, the construction of the center panel 16 as an integral part of the fuselage adds materially to the strength of such panel and enables the major portion of the landing gear to be housed in such panel and not entirely in the fuselage as has been the practise heretofore.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What is claimed is:

1. The combination, in an aeroplane adapted to alight upon either land or water, of a body having wings formed integrally thereon and projecting laterally out from opposite sides thereof, a substantially V shaped hydroplane surface jointly formed by the under surface of the body and the under surface of the wings in the vicinity of said body, said hydro surface adapting the machine to alight upon and travel in contact with water, and a wheeled landing gear carried by and adjustable relatively to said body, said landing gear in one position of adjustment affording a means beneath said hydro surface whereby the machine is adapted to alight upon and travel in contact with land.

2. In an aeroplane adapted to alight upon either land or water, the combination, of a fuselage, aeroplane wings projected laterally out from opposite sides of the fuselage, each wing at its root being appreciably thickened, formed as an integral part of the fuselage and being provided with an opening in its under surface, a hydroplane surface formed on the under side of the fuselage, the under surface of the thickened portion of the aeroplane wings forming a part of said hydroplane surface, and a landing gear including wheels movable bodily through said openings to positions respectively above and below said hydroplane surface, the wheels when extended beneath said hydroplane surface affording a means whereby the machine is adapted to alight upon and travel in contact with land.

3. In an aeroplane adapted to alight upon either land or water, the combination, of a fuselage, aeroplane wings projected laterally out from opposite sides of the fuselage, the under surface of the wings adjacent to the fuselage affording, in combination with the under surface of the fuselage, a substantially V shaped hydroplane surface, said hydroplane surface having openings formed therein at opposite sides of the apex of the V, and surface affording a means whereby the machine is adapted to alight upon and travel in contact with water, and a retractable landing gear including wheels movable bodily through said openings to positions respectively above and below said hydroplane surface, the wheels when extended affording a means whereby the aeroplane is adapted to alight upon and travel in contact with land.

4. In an airplane, the combination, of a fuselage, airplane wings projected laterally out from opposite sides of the fuselage, landing gear struts pivotally carried by the wings, landing gear struts pivotally carried by the fuselage, the pivot axes of the first mentioned struts being fixed and the pivot axes of the last mentioned struts being movable, wheels carried by the landing gear struts, and means for retracting the landing gear in its entirety by withdrawing the struts having movable pivot axes into the fuselage and laterally folding the struts having fixed pivot axes as the first mentioned struts are withdrawn.

5. In an airplane, the combination, of a fuselage, airplane wings extended laterally out from opposite sides of the fuselage, a retractable landing gear including struts provided with fixed pivot axes and movable pivot axes respectively, the struts provided with movable pivot axes being fastened to the fuselage in the plane of its vertical center line and the struts provided with fixed pivot axes being fastened to the fuselage at points laterally removed from said vertical center line, wheels carried by the landing gear struts, and means to retract the landing gear by withdrawing the struts having movable pivot axes deeper into the fuselage.

6. In an airplane, the combination of a fuselage, airplane wings extended laterally out from opposite sides of the fuselage, a retractable landing gear including landing gear struts having fixed pivot axes carried by the airplane wings, landing gear struts having movable pivot axes carried by the fuselage, landing gear wheels carried by the struts collectively, and means to retract the landing gear in its entirety by withdrawing the struts having movable pivot axes bodily into the fuselage and inwardly folding the struts having fixed pivot axes toward the fuselage, the wheels of the landing gear when retracted being bodily enclosed in the wings.

7. In an airplane, a fuselage, superposed supporting surfaces extended intermediately across the fuselage, interplane struts connecting the superposed wings, landing gear struts pivotally carried by the lower airplane wings, the pivot axes of the landing gear struts being fixed relatively to the wings and situated directly adjacent the lower interplane strut ends, landing gear struts pivotally carried by the fuselage, the pivot axes of the last mentioned struts being movable within the fuselage, landing gear wheels carried by the struts collectively, and means to withdraw the struts having movable pivot axes into the fuselage to laterally and inwardly fold the wheels.

8. In an airplane, a framed structure having an open space therein, a landing gear including landing gear struts and wheels, the wheels being movable through the open space to positions respectively within and without the framed structure, and devices carried by and movable with the struts to at least partly close the open space in the framed structure when the wheels are fully retracted.

9. In an airplane, a fuselage, landing gear struts pivotally supported at opposite sides of the fuselage, the pivot axes of the landing gear struts being fixed, landing gear struts pivotally supported centrally of the fuselage, the pivot axes of the last mentioned struts being movable, wheels carried by the landing gear struts, and means to withdraw the struts having movable pivot axes bodily into the fuselage to retract the landing gear in its entirety.

In testimony whereof I hereunto affix my signature.

HARVEY C. MUMMERT.